United States Patent
Blard et al.

(10) Patent No.: US 6,302,254 B1
(45) Date of Patent: Oct. 16, 2001

(54) FRICTION CLUTCH WITH WEAR TAKE-UP DEVICE PROVIDED WITH RESETTING MEANS AND TOOL ADAPTED TO RESET SAID DEVICE

(75) Inventors: Michel Blard, Issy les Moulineaux; Eric Breton, Versailles, both of (FR)

(73) Assignee: Valeo (FR)

( * ) Notice: Subject to any disclaimer, the term of this patent is extended or adjusted under 35 U.S.C. 154(b) by 0 days.

(21) Appl. No.: 09/230,542

(22) PCT Filed: May 28, 1998

(86) PCT No.: PCT/FR98/01066

§ 371 Date: Jan. 3, 2000

§ 102(e) Date: Jan. 3, 2000

(87) PCT Pub. No.: WO98/54482

PCT Pub. Date: Dec. 3, 1998

(30) Foreign Application Priority Data

May 30, 1997 (FR) .................................................. 97 06655

(51) Int. Cl.⁷ ...................................................... F16D 13/75
(52) U.S. Cl. ..................................... 192/70.25; 192/111 A
(58) Field of Search ............................. 192/70.25, 111 A, 192/111 B

(56) References Cited

U.S. PATENT DOCUMENTS

| 4,249,644 | * | 2/1981 | Urban ........................... 192/111 A X |
| 4,454,933 | * | 6/1984 | Hunnicutt et al. ........... 192/111 A X |
| 4,497,399 | * | 2/1985 | Kopich ............................. 192/111 A |
| 5,230,413 | | 7/1993 | Lewis et al. . |
| 5,320,205 | * | 6/1994 | Kummer et al. .................. 192/70.25 |
| 5,634,541 | * | 6/1997 | Maucher ............................ 192/70.25 |
| 5,816,379 | * | 10/1998 | De Briel et al. .................. 192/70.25 |
| 5,845,750 | * | 12/1998 | De Briel et al. .................. 192/70.25 |
| 6,109,412 | * | 8/2000 | Cole et al. ........................ 192/70.25 |

FOREIGN PATENT DOCUMENTS

| 2605692 | 7/1993 | (FR) . |
| 2739159 | 3/1997 | (FR) . |
| 2753503 | 3/1998 | (FR) . |
| 2753758 | 3/1998 | (FR) . |
| 2229779 | 10/1990 | (GB) . |

* cited by examiner

Primary Examiner—Rodney H. Bonck
(74) Attorney, Agent, or Firm—Liniak, Berenato, Longacre & White

(57) ABSTRACT

The friction clutch comprises a reaction plate designed to be blocked on a driving shaft, a friction disk, bearing at its external periphery friction linings, a pressure plate, a cover (52) fixed on the reaction plate, an axially operating clutching device (53) controlled by a disengaging device and which operate between the cover (52) and the pressure plate through a support device, the pressure plate being integral in rotation with the cover (52) and being subjected to the action of an elastic return device (9) axially returning the pressure plate towards the cover (52). The clutch also comprises a wear take-up device comprising a toothed gear (59) with which a worm screw (63) co-operates and a device (90) for resetting in the position corresponding to linings in new condition, the device (90) being placed at the worm screw (63) tip to drive the latter in rotation.

12 Claims, 2 Drawing Sheets

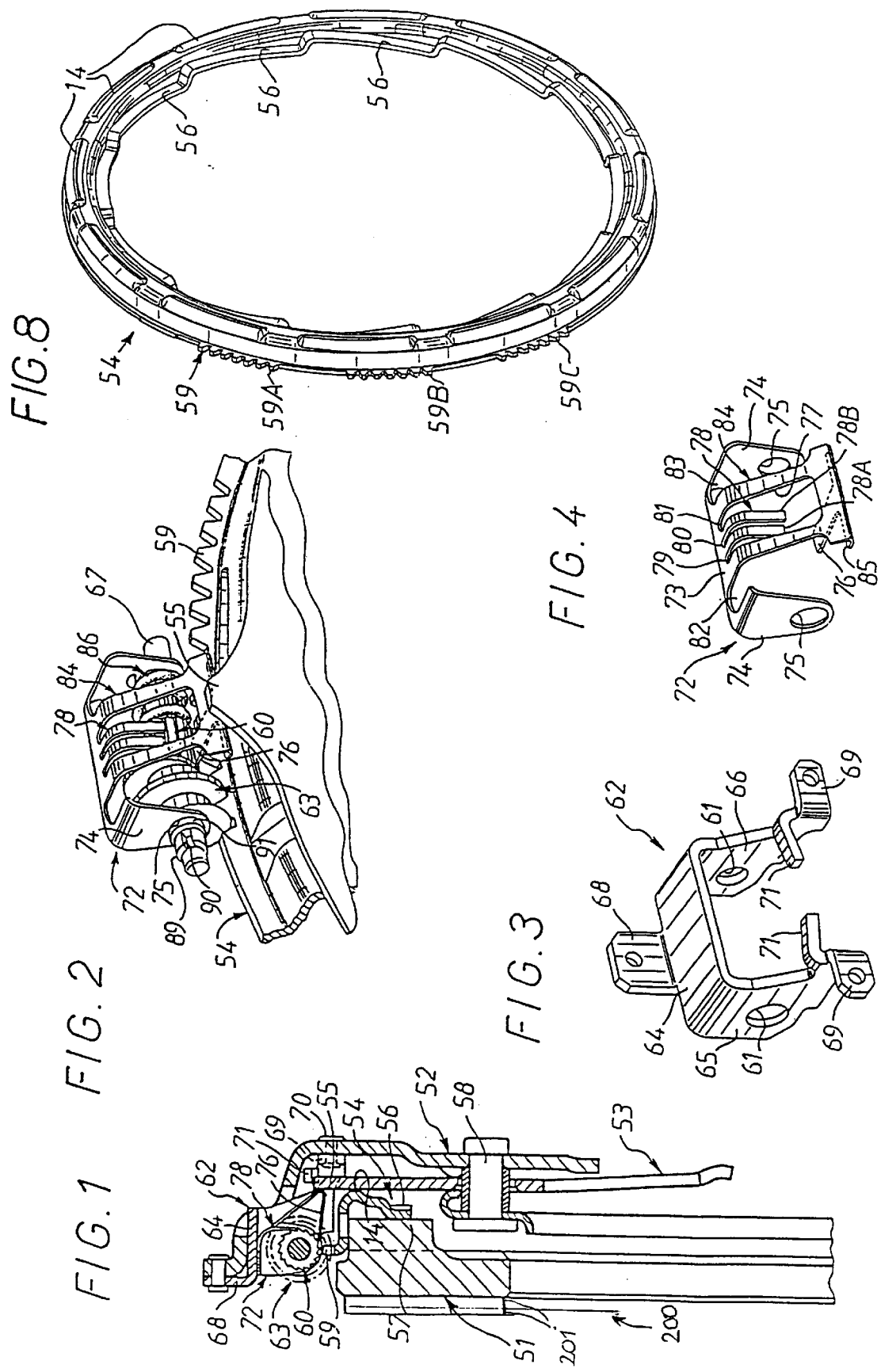

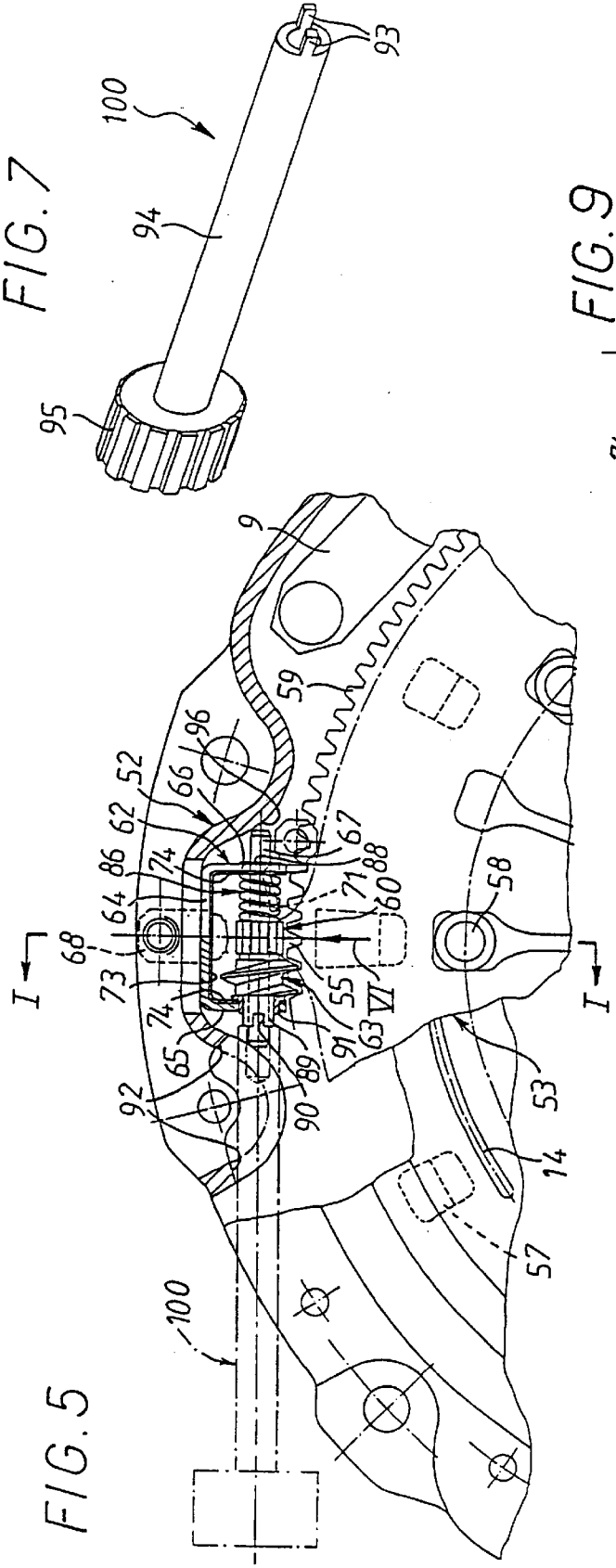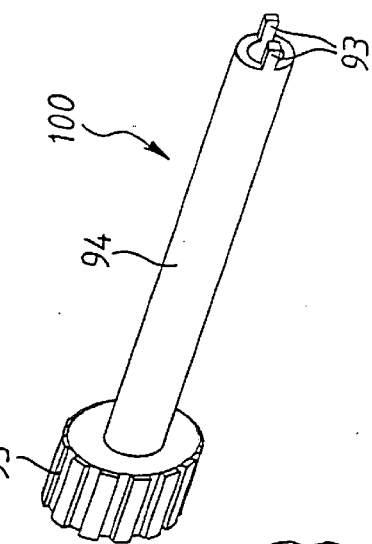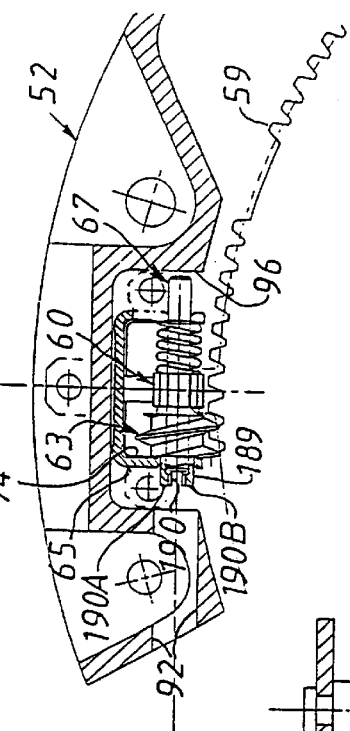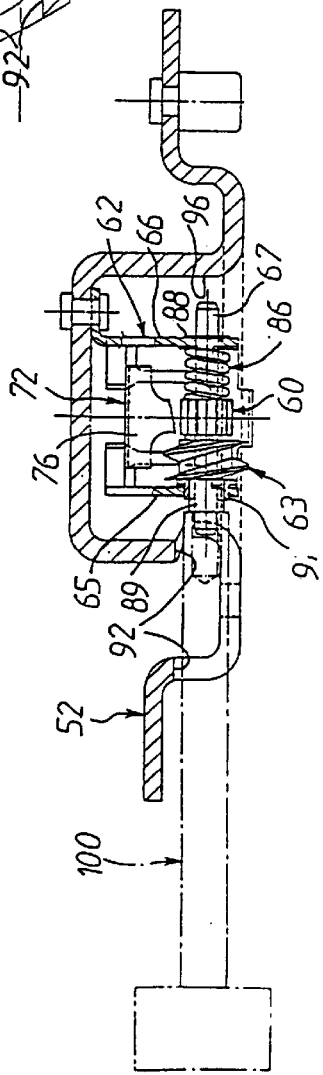

# FRICTION CLUTCH WITH WEAR TAKE-UP DEVICE PROVIDED WITH RESETTING MEANS AND TOOL ADAPTED TO RESET SAID DEVICE

BACKGROUND OF THE INVENTION

1. Field of the Invention

The present invention concerns a friction clutch, in particular for motor vehicles, and more particularly a clutch provided with a device for compensating wear due in particular to wear of the friction linings, said device, referred to hereinafter as a wear compensator device, operating as and when said linings wear.

2. Description of Related Art

A conventional friction clutch generally includes a reaction plate, possibly in two parts to form a damper flywheel, constrained to rotate with a first shaft, usually a driving shaft such as the crankshaft of the internal combustion engine, its outside periphery supporting a cover to which at least one pressure plate is attached.

The pressure plate is constrained to rotate with the cover and the reaction plate but can be moved axially by axially acting clutch engaging means operated by clutch release means; the clutch engaging means can be coil springs or two Belleville washers disposed in series and acted on by clutch release levers forming the clutch release means; the clutch engaging and clutch release means are generally part of the same component, for example a metal diaphragm bearing on the cover; the diaphragm can be disposed in series as described in document FR-A-2 753 758 or in parallel with a Belleville washer to assist the clutch release force.

A friction disc carrying friction linings at its outside periphery and constrained to rotate with a shaft, usually a driven shaft such as the input shaft of the gearbox, is disposed between the pressure plate and the reaction plate so that it is clamped between them when the clutch is in the engaged position. The clutch engaging means move the pressure plate axially when they are actuated by a clutch release thrust bearing through the intermediary of the clutch release means.

During the service life of a clutch of the above kind the friction linings and the materials on which they bear on the pressure plate and the reaction plate wear away, which varies the position of the pressure plate and the positions of the axial action clutch engaging means and the clutch release thrust bearing, which in turn varies the clamping force between the friction disc and the pressure and reaction plates because of modifications to the working conditions of the clutch release means, and this affects the force needed to release the clutch. Providing a clutch of the above kind with a wear compensator device avoids the above drawbacks because the clutch engaging means and the clutch release thrust bearing, usually bearing at all times on the clutch release means, occupy the same position when the clutch is in the engaged position.

If a clutch is provided with a wear compensator device it is beneficial, after it has exercised its function, to return it to a position corresponding to new friction linings, for example after changing the friction disc because its linings have been worn down; this also facilitates placing the clutch in a storage configuration.

SUMMARY OF THE INVENTION

The present invention consists in a clutch including a wear compensator device in which the above manoeuvre is possible and simple to carry out, naturally without demounting the assembly constituting the clutch mechanism.

In accordance with the invention, a friction clutch, in particular for motor vehicles, of the kind including a reaction plate adapted to be constrained to rotate with a driving shaft, a friction disc carrying friction linings at its outside periphery and adapted to be constrained to rotate with a driven shaft, a pressure plate, a cover fixed to the reaction plate, axially acting clutch engaging means operated by clutch release means and operative between the cover and the pressure plate through the intermediary of bearing means, the pressure plate being constrained to rotate with the cover, able to move axially relative to the cover and acted on by return spring means biasing the pressure plate axially towards the cover, said clutch also including a wear compensator device, is characterised in that the wear compensator device comprises means for resetting it to a position corresponding to new friction linings.

Said wear compensator device advantageously includes ramp means comprising circumferentially distributed inclined ramps, said ramp means being disposed axially between the bearing means and the pressure plate and adapted to co-operate with counter-ramp means, said wear compensator device also including teeth with which a tangentially disposed lead screw co-operates, one of the two ramp members and the counter-ramp means being attached to said teeth, means for rotating the lead screw being rendered operative by wear of the friction linings when the clutch is engaged.

The axially acting clutch engaging means preferably comprise a diaphragm.

The ramp means advantageously comprise a ring comprising the ramps and the bearing means.

The counter-ramp means preferably consist in studs adapted to co-operate with the ramps of the ramp means.

The lead screw is advantageously mobile along its axis and is acted on by compensator spring means.

The means for rotating the lead screw preferably comprise a ratchet wheel constrained to rotate with the lead screw.

The lead screw and the means for rotating the lead screw are advantageously carried by a support attached to the cover.

The lead screw and the means for rotating the lead screw preferably rotate on a shaft carried by the support, the means for resetting the wear compensator device comprising rotational coupling means at the end of the lead screw for rotating the lead screw.

The rotational coupling means are advantageously adapted to receive a complementary shape end of a tool.

The rotational coupling means preferably comprise at least one axial notch adapted to receive a finger at the end of the tool; alternatively the rotational coupling means comprise a slot flanked by transverse rims.

The cover advantageously has a passage for the tool aligned with the shaft.

The teeth preferably comprise a plurality of circumferentially spaced teeth elements.

Each teeth element is advantageously globally radially aligned with a ramp.

The number of teeth elements is preferably the same as the number of ramps.

The present invention also consists in a tool for resetting a wear compensator device fitted to a clutch, said tool having features adapted to co-operate with the wear compensator device of the above clutch.

BRIEF DESCRIPTION OF THE DRAWINGS

To explain the subject matter of the invention in more detail one embodiment of the invention will now be described by way of purely illustrative and non-limiting example with reference to the accompanying drawings, in which:

FIG. 1 is a partial view in section taken along the line I—I in FIG. 5 of a clutch fitted with a wear compensator device in accordance with the invention;

FIG. 2 is a perspective view showing the wear compensator device without its support;

FIG. 3 is a perspective view of the support;

FIG. 4 is a perspective view of the spring device;

FIG. 5 is a partial plan view of the clutch from FIG. 1;

FIG. 6 is a lateral view in the direction of the arrow VI in FIG. 5;

FIG. 7 is a perspective view of the resetting tool;

FIG. 8 is a perspective view showing a variant of the ramp means;

FIG. 9 is a partial view analogous to FIG. 5 showing a variant.

DETAILED DESCRIPTION OF PREFERRED EMBODIMENTS

FIGS. 1 through 6 show a clutch fitted with a wear compensator device of the kind described in French Patent Application FR-A-2 753 503 filed Sep. 17, 1996 to which reference should be had for more details.

The figures show a friction clutch mechanism, in particular for a motor vehicle, that comprises a pressure plate 51 designed to co-operate with a friction disc shown diagrammatically at 200 in FIG. 1 and carrying friction linings 201 at its outside periphery, itself co-operating with a reaction plate. The reaction plate, not shown, is adapted to be constrained to rotate with a driving shaft such as the crankshaft of the internal combustion engine. The friction disc is constrained to rotate with a driven shaft such as the input shaft of the gearbox. A friction disc is disclosed in documents GB-A-2 310 898, GB-A-2 294 301, FR-A-2 739 159 and FR-A-2 605 692.

The pressure plate 51 is constrained to rotate with the cover 52 by tangential tongues 9 one of which can be seen in FIG. 5 and which are elastic to constitute also means for biasing the pressure plate 51 towards the cover 52.

The cover 52 is pressed from sheet metal. The cover 52 has a back and means for fixing it to a reaction plate, which is possibly subdivided to form a damper flywheel. For more information see document GB-A-2 294 301 showing the reaction plate and a damper flywheel (FIGS. 35 and 36). Here the cover 52 is broadly dish-shaped and has at its outside periphery a radial rim forming means for fixing the cover to the reaction plate, said rim having holes in it for fixing members such as screws for fastening the cover to the reaction plate.

Although the pressure plate 51 is constrained to rotate with the cover 52 it is movable axially relative to the cover 52 by axially acting clutch engaging means operated by clutch release means, here a diaphragm 53 articulated to the cover 52 by columns 58 carried by the back of the cover 52, which has a central hole in it.

Here the clutch is of the push type, which means that a clutch release thrust bearing, not shown, must push on the inside end of the fingers of the diaphragm 53 to disengage the clutch. To this end the back of the cover 52 carries a primary support consisting of a ring, for example, or as here a pressed portion of the inside periphery of the back of the cover and, facing the primary support, a secondary support in the form of a rolled ring carried by the columns 58, or any other means. The inside periphery of the Belleville washer of the diaphragm 53 is mounted so that it can tilt between said primary and secondary supports. The outside periphery of its Belleville washer is in contact with bearing areas 14 described hereinafter.

A wear compensator device is provided to maintain the axially acting clutch engaging means 53 in a position independent of the wear of the friction disc linings and to a lesser degree independent of the wear of the pressure plate 51 and the reaction plate, the friction faces of which wear because they are in contact with the disc linings when the clutch is engaged.

The wear compensator device 10 comprises ramp means 54 disposed circumferentially; to be more precise, the ramp means 54 comprise a sheet metal ring cut out and bent to shape to feature ramps 56 disposed circumferentially; said ring also has bearing areas 14 consisting of the rounded top edge of circular arc-shape pressed portions centred on the axis of the clutch and radially outside the ramps 56.

The pressure plate 51 has integral circumferentially spaced studs 57 on its face that faces towards the back of the cover 52, radially beyond the columns 58; the distance between the studs corresponds to the circumferential distance between two successive ramps 56, the studs 57 each being adapted to co-operate with a ramp 56.

The ramp means 54 are disposed axially between the diaphragm 53 and the pressure plate 51 so that the studs 57 receive the ramps 56 and the diaphragm 53 co-operates with the bearing areas 14 which thus constitute the bearing means through which the diaphragm 53 acts on the pressure plate 51. This arrangement is simple and economic, the ramp means 54 being of metal and obtained by pressing.

One of the bearing areas 14 of the ramp means 11 is extended at its outside periphery by a rim parallel to the axis of the clutch and terminating in a transverse lip, i.e. a lip in a plane perpendicular to the axis of the clutch, having teeth 59 at its periphery so that the bearing areas 14 can be continuous and the rim is centred by an increased thickness of the pressure plate 51.

The wear compensator device further includes a ratchet wheel 60 with inclined teeth attached to a shaft 67 which also carries a lead screw 63; the thread and the pitch of the lead screw 63 match the teeth 59; the conditions of co-operation between the lead screw 63 and the teeth 59 are described hereinafter.

The shaft 67 of the ratchet wheel 60 is rotatably carried by a support 62, seen more clearly in FIG. 3, cut from sheet metal and bent into a U-shape having a core 64 and two wings 65, 66 for supporting the shaft 67; to this end, each of the wings features a circular hole 61 adapted to receive the shaft; the core 64 carries a right-angled lateral lug 68 directed outwards and designed to be fixed to an area of the outside rim of the cover 52 by a rivet, this area being offset axially towards the back of the cover 52. The simplified cover 52 includes an opening through which the core 64 passes.

On the side opposite the lug 68, the wings 65 and 66 of the support 62 have an axial extension the end of which is bent outwards to constitute a fixing lug 69 parallel to the lug 68 and designed to be fixed to the back of the cover 52 by a rivet 70; the edge of said extension directed towards the core 64 is provided with rims 71 extending towards each other globally parallel to the core 64 and designed to constitute abutments whose function will become apparent hereinafter; the facing ends of said rims 71 are at a sufficient distance apart to enable unimpeded movement of the actuator 55 during clutch engagement and release.

The support 62 is adapted to receive a spring member 72.

Here the spring member 72, seen better in FIG. 4, is stirrup-shaped and has an elongated flat body 73 with an arm 74 at each end in which there is a hole 75 adapted to receive the shaft 67; the two arms 74 are parallel, on the same side of the body 73 and globally perpendicular to the body.

On one longitudinal edge the body 73 is extended by an oblique extension 84 on the same side as the arms 74, notches 82 and 83 in the body 73 delimiting the extension 84 relative to the ends of the body 73 carrying the arms 74; the notches 82 and 83 also impart some elasticity to the extension 84.

The free end of the extension 84 has a rim 85 extended by an operating tongue 76 extending towards the body 73, to which it is parallel.

A cut-out 77 is formed in the extension 84; this cut-out 77 and notches 79, 80 and 81 in the body 73 provide a ratchet 78 made up of two blades 78a and 78b; their free ends are perpendicular to the body 73 are slightly different lengths; the difference in their lengths is such that when the blades 78a and 78b bear elastically on the ratchet wheel 60 they are offset parallel to the arms 74 by an amount less than the length of a tooth on the ratchet wheel 60.

A compression coil spring 86 is disposed between the ratchet wheel 60 and the free end of the arm 66, around the shaft 67; the lead screw 63 and the ratchet wheel 60 are in one piece.

The coil spring 86 constitutes the compensator spring means; the ratchet wheel 60 is in line with the ratchet 78 which by co-operating with the inclined teeth on the ratchet wheel 60 prevents the ratchet wheel 60 and the lead screw 63 turning in the anti-clockwise direction, as seen in FIG. 1.

The support 62 carrying the ratchet wheel 60, the lead screw 63 and the coil spring 86 being attached to the cover 52, the diaphragm 53 moves relative to it during clutch release and clutch engagement; the diaphragm 53 carries a radial appendix at its periphery and this actuator 55 (FIG. 2) extends radially outside the Belleville washer part of the diaphragm 53 to cooperate with the extension 84 of the spring member 72. Because of this arrangement, when the diaphragm 53 tilts during clutch release and clutch engagement the actuator 55 moves the extension 84 from right to left, as seen in FIG. 1, and the operating tongue 76, co-operating with the teeth on the ratchet wheel 60, turns the ratchet wheel 60 clockwise; when the actuator 55 returns, moving from left to right, the elasticity of the extension 84 of the spring member 72 and the inclination of the teeth are such that the actuator 55 is moved towards the right, rising up the teeth, which are prevented from rotating by the ratchet 78.

The operation of the play compensator device just described is known in itself and will not be described in detail; if necessary reference may be had to French Patent Application FR-A-2 753 503 already mentioned, the corresponding part of the description of which must be considered to be an integral part of the present application. When the friction linings wear, the diaphragm tilts and its actuator operates on the spring member 72 and the operating tongue to turn the ratchet wheel and compress the spring 86 when the clutch is engaged. When the clutch is released the spring 86 expands and operates on the screw 63 which, via the teeth 59, turns the ring 54 to compensate wear due at least to wear of the friction linings.

Here the lead screw 63 and the ratchet wheel 60, which are in one piece, are threaded onto the shaft 67 carried by the support 62; the shaft 67 passes through the wings 65 and 66 of the support 62 and is positioned axially relative to the support on one side by a circlip 88 which co-operates with the outside face of the wing 66 and immobilises it from right to left, as shown in FIGS. 5 and 6, and on the other side by the end of the shaft 67 abutting against the re-entrant part 96 of the skirt of the cover 52, which immobilises it in the other direction.

On the side opposite the ratchet wheel 60 the lead screw 63 is extended by a sleeve 89 around the shaft 67 and passing through the corresponding arm 74 of the spring member 72 and the ring 65 of the support 62; a shouldered bush 91 forming a bearing is advantageously disposed radially between the sleeve 89 and said arm 74 and said wing 65.

The sleeve 89 projects axially outwards of the wing 65 of the support 62 and the shoulder bush 91; here the projecting part of the sleeve 89 has two axial cut-outs or notches 90 in diametrally opposed positions constituting means for preventing rotation of the lead screw 63 and forming part of the means for resetting the wear compensator device.

A resetting tool 100 is provided.

The tool 100, seen better in FIG. 7, comprises a rod 94 one end of which carries an operating knob 95, here a knurled knob, and the other end of which is hollow and cut to a shape comprising two diametrally opposed fingers 93 complementary to the axial notches 90 in the sleeve 89 of the lead screw 63.

The inside diameter of the recess in the tool matches the outside diameter of the shaft 67 that it is to receive, the end of the shaft 67 advantageously extending axially beyond the sleeve 89: this facilitates centring of the tool 100 relative to the sleeve 89 to facilitate bringing the fingers 93 of the tool 100 into coincidence with the axial notches 90 of the sleeve 89.

Cut-outs in the cover 52 define a passage 92 for the tool 100 aligned with the shaft 67.

The operation to reset the wear compensator device is evident from the foregoing description.

When the tool is in place, the fact that the lead screw 63 is prevented from rotating relative to the tool 100, the fingers 93 of which co-operate with the axial notches 90, means that turning the tool 100 turns the lead screw 63 relative to the cover 52 and so the teeth 59 can be turned relative to the pressure plate 51 and the ramps 56 can be turned relative to the studs 57.

The circumferential length of the teeth 59 corresponds to the amount of wear to be compensated, allowing obviously for the few teeth with which the lead screw 63 meshes in the initial configuration.

Of course, a plurality of equiangularly spaced wear compensator devices can be provided, for example three devices at 120 degrees to each other.

When the chosen amount of wear corresponding to the circumferential length of the teeth 59 has been compensated, the lead screw 63 no longer co-operates with the teeth 59.

To reset the wear compensator device when the friction disc is replaced it is sufficient to use a tool of any kind to turn the ramp means 54 about their axis so that the ramps 56 rise up the studs 57 until the first tooth 59 meets the first thread of the lead screw 63; by rotating the lead screw 63 using the resetting tool 100 the first few teeth 59 are then engaged with the threads of the lead screw 63.

The angle through which the ramp means 54 must be turned in the first phase of resetting depends on the number of wear compensator devices; usually there is only one wear compensator device and the angle is therefore large. To minimise the angle regardless of the number of devices it is possible to provide teeth 59 made up of a plurality of teeth elements like the elements 59A, 59B, 59C shown in FIG. 8; the number of teeth elements is advantageously the same as the number of ramps 56, each element corresponding to the chosen wear of a friction disc; the ramps 56 face the teeth elements 59A, 59B, 59C.

FIG. 9, which is analogous to FIG. 5, shows a variant of the resetting means; in FIG. 9 identical parts or parts having the same function compared to FIG. 5 carry the same reference numbers.

Here the lead screw 63 is extended at the end opposite the ratchet wheel 60 by a sleeve 189 around the shaft 67 and having at its end a diametral stop 190 flanked by transverse rims 190A, 190B.

By virtue of this arrangement the resetting tool no longer needs to be a special tool, and an ordinary screwdriver can be used.

By virtue of the rims 190A, 190B the shaft 67 is axially immobilised in the direction from right to left as shown in the figure and no circlip like the circlip 88 from FIG. 5 is needed.

Here the sleeve 189 passes directly through the arm 74 of the spring member 72 and the wing 65 of the support 62: of course, as previously, a shouldered bush like the bush 91 from FIG. 5 forming a bearing could be disposed between the sleeve 189 and said arm 74 and said wing 65.

Alternatively, the sleeve 189 passes through the parts 74, 72 and 65 and has a polygonal external profile, the tool then having at the end opposite the knob 95 a blind hole with a polygonal profile complementary to that of the sleeve. The structures can therefore be interchanged, the tool having a recess co-operating with the complementary end of the sleeve.

What is claimed is:

1. Friction clutch, for motor vehicles, including a reaction plate adapted to be constrained to rotate with a driving shaft, a friction disc carrying friction linings at an outside periphery and adapted to be constrained to rotate with a driven shaft, a pressure plate (51), a cover (52) fixed to the reaction plate, axially acting clutch engaging means (53) operated by clutch release means and operative between the cover (52) and the pressure plate (51) through the intermediary of bearing means (14), the pressure plate (51) being constrained to rotate with the cover (52), able to move axially relative to the cover and acted on by return spring means (9) biasing the pressure plate (51) axially towards the cover (52), said clutch also including an automatic wear compensator device, wherein the wear compensator device comprises means for resetting it to a position corresponding to new friction linings.

2. Friction clutch according to claim 1 wherein the axially acting clutch engaging means (53) comprise a diaphragm and the ramp means (54) comprise a ring comprising the ramps (56) and the bearing means (14).

3. Friction clutch according to claim 2 wherein the counter-ramp means consist in studs (57) adapted to co-operate with the ramps (56) of the ramp means (54).

4. Friction clutch according to claim 1 wherein said wear compensator device includes ramp means (54) comprising circumferentially distributed inclined ramps (56), said ramp means (54) being disposed axially between the bearing means (14) and the pressure plate (51) and adapted to co-operate with counter-ramp means (57), said wear compensator device also including teeth (59) with which a tangentially disposed lead screw (63) co-operates, one of the two ramp members (54) and the counter-ramp means (57) being attached to said teeth (59), means (60) for rotating the lead screw (63) being rendered operative by wear of the friction linings when the clutch is engaged.

5. Friction clutch according to claim 4 wherein the lead screw (63) is mobile along its axis and is acted on by compensator spring means (86) by virtue of the fact that the means (60) for rotating the lead screw (63) comprise a ratchet wheel constrained to rotate with the lead screw (63).

6. Friction clutch according to claim 4 wherein the lead screw (63) and the means (60) for rotating the lead screw are carried by a support (62) attached to the cover (52) and the lead screw (63) and the means (60) for rotating the lead screw rotate on a shaft (67) carried by the support (62), the means for resetting the wear compensator device comprising rotational coupling means (90–190) at the end of the lead screw (63) for rotating the lead screw (63).

7. Friction clutch according to claim 6 wherein the rotational coupling means (90–190) are adapted to receive a complementary shape end (93) of a tool (100).

8. Friction clutch according to claim 7 wherein the rotational coupling means comprise at least one axial notch (90) adapted to receive a finger (93) at the end of the tool (100).

9. Friction clutch according to claim 7 wherein the rotational coupling means comprise a slot (190) flanked by transverse rims (190A–190B).

10. Friction clutch according to claim 7 wherein the cover (52) has a passage (92) for the tool (100) aligned with the shaft (67).

11. Friction clutch according to claim 10 wherein the teeth (59) comprise a plurality of circumferentially spaced teeth elements (59A, 59B, 59C).

12. Friction clutch according to claim 11 wherein each teeth element (59A, 59B, 59C) is radially aligned with a ramp (56).

* * * * *